UNITED STATES PATENT OFFICE.

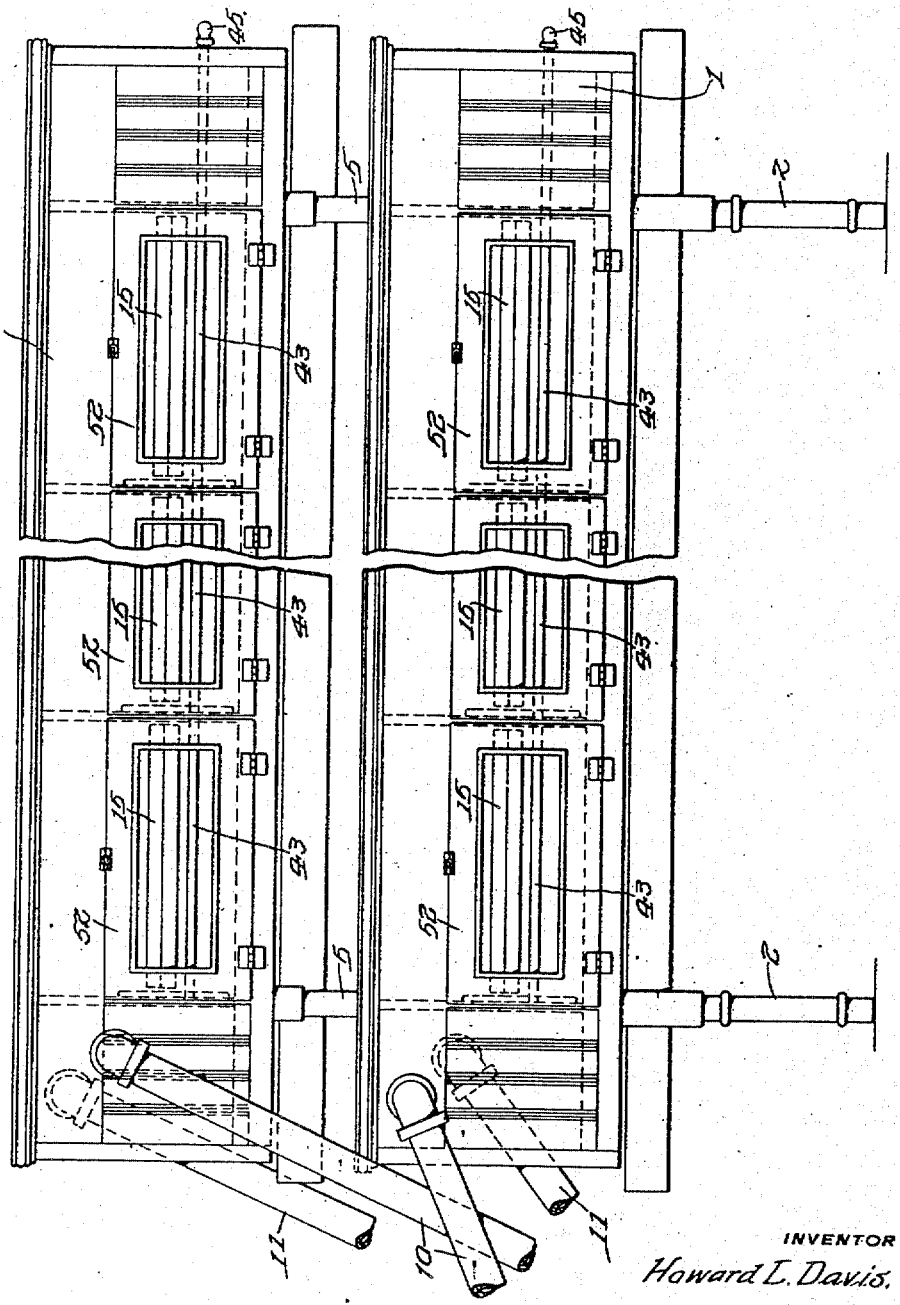

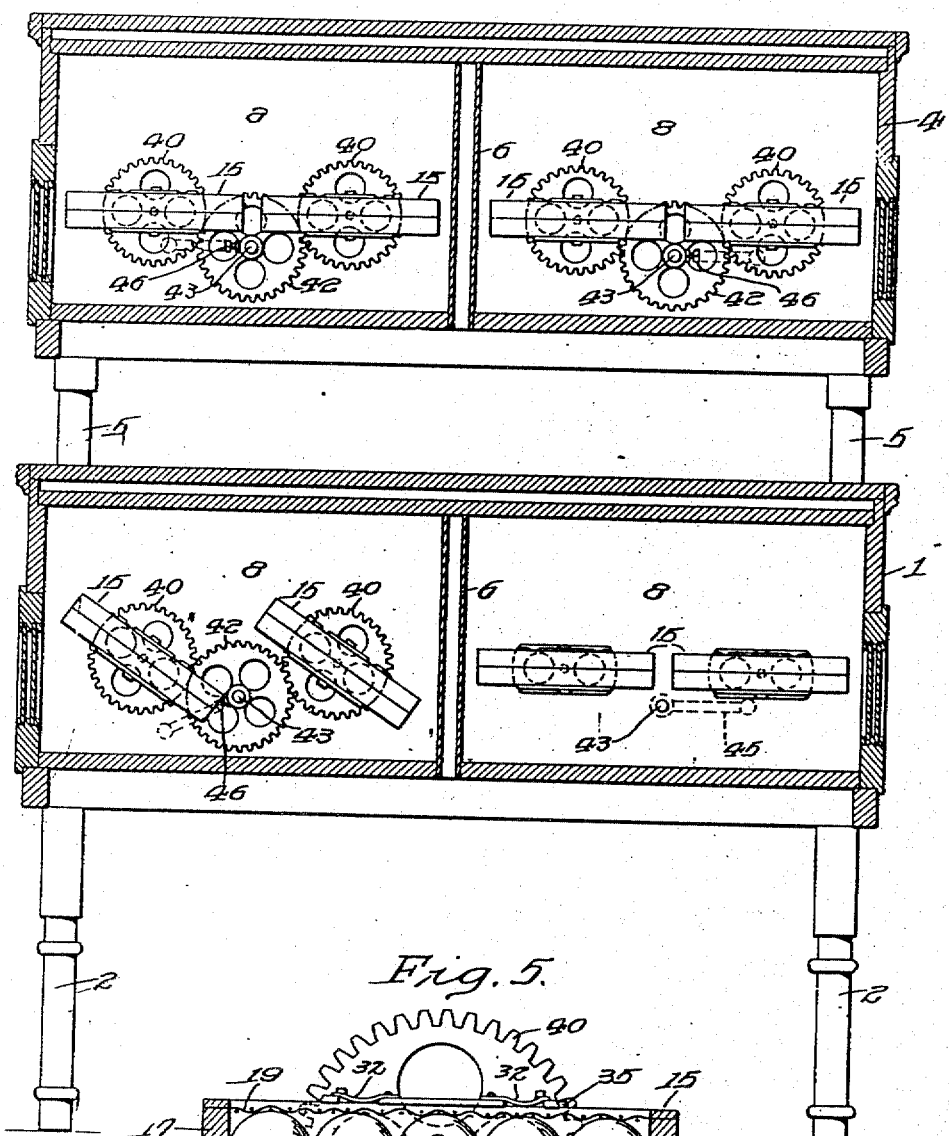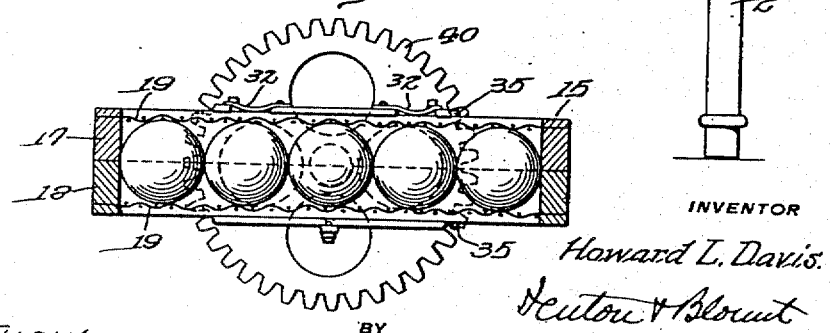

HOWARD L. DAVIS, OF PLUMSTEAD TOWNSHIP, OCEAN COUNTY, NEW JERSEY, ASSIGNOR TO HAROLD L. WATSON, OF LANCASTER, PENNSYLVANIA.

INCUBATOR.

1,259,726.                Specification of Letters Patent.         Patented Mar. 19, 1918.

Original application filed August 30, 1913, Serial No. 787,422. Divided and this application filed August 19, 1916. Serial No. 115,744.

*To all whom it may concern:*

Be it known that I, HOWARD L. DAVIS, a citizen of the United States, and a resident of Plumstead township, in the county of Ocean and State of New Jersey, have invented certain new and useful Improvements in Incubators, of which the following is a specification, reference being had to the accompanying drawings.

The invention relates more particularly to incubators wherein there are a plurality of compartments in which the eggs are arranged during incubation so that the capacity of the incubator may be very great and which comprise suitable heating and ventilating means, for example, as described in my pending application for Letters Patent of the United States, Serial No. 787,422, filed August 30, 1913, of which the present application is a division.

A principal object of my invention is to provide means whereby the supporting trays, or other means upon which the eggs are supported, may be turned upside down or otherwise shifted so that all of the eggs in the tray may be simultaneously repositioned when desired.

A further object of my invention is to provide means in an incubator having a plurality of compartments for simultaneously turning or otherwise shifting the eggs in an incubator as when the same are on trays in each compartment and comprising means whereby one or more of the egg holding or supporting means in a compartment may be disconnected from the turning or shifting mechanism and maintained or locked in fixed position when desired.

A still further object of my invention is to provide in an incubator having a plurality of compartments means extending outside of the incubator and its compartments for simultaneously or selectively turning or shifting the egg-supporting means within said compartments to turn the eggs in that compartment.

My invention further includes all of the other various novel objects and features of construction and arrangement hereinafter more definitely specified and described.

Figure 3:
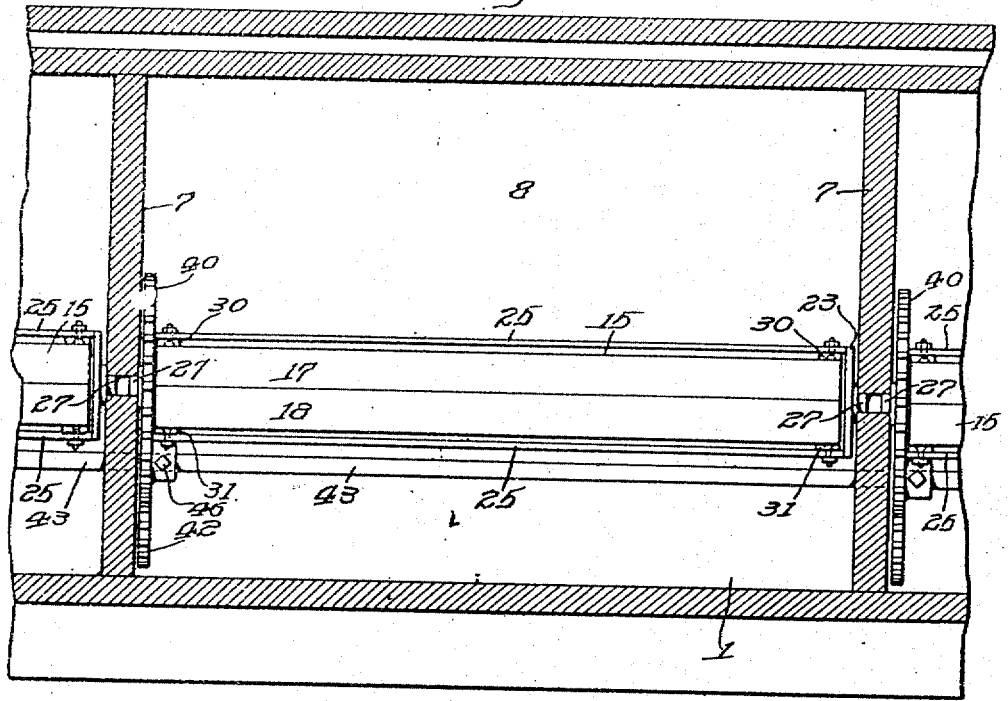
Figure 4:
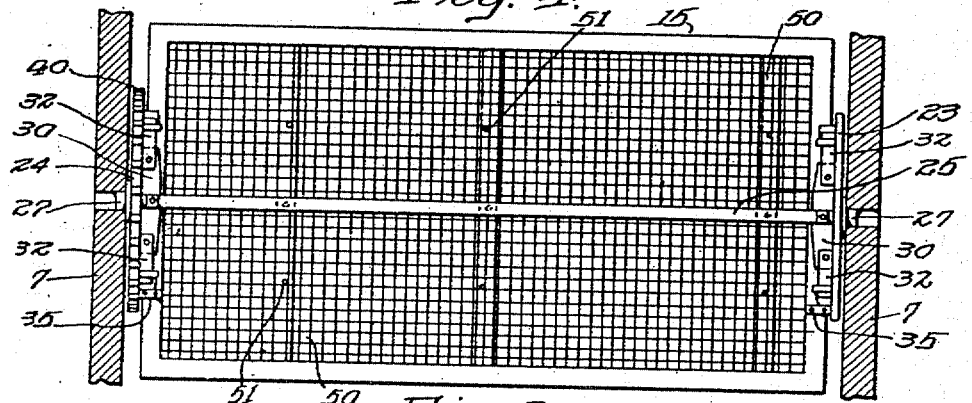

In the accompanying drawings, Figure 1 is a front view of an incubator embodying one form of the invention; Fig. 2, a transverse sectional view through the incubator; Fig. 3, a fragmentary longitudinal sectional view through a portion of the incubator showing the parts on an enlarged scale; Fig. 4, a top plan view of one of the trays which is illustrated as showing one manner of supporting the eggs; Fig. 5, a transverse sectional view through one of the trays, and Fig. 6 a longitudinal sectional view through one of the trays.

In the form of the invention shown in the drawings the incubator comprises a casing 1 mounted on suitable supporting legs 2. The incubator also, as herein shown, comprises a second casing 4 mounted on supporting legs 5 in turn mounted on the top of the lower casing thus forming a double deck incubator. Each casing is divided by longitudinal partitions 6 and also by a plurality of transverse partitions 7 thereby forming a plurality of compartments 8 located side by side and end to end. Suitable apertures or the like (not shown) are provided in the several walls of the casing and in the partitions for affording a circulation of fresh air through the compartments during the operation of the incubator. The incubator may also be provided with suitable means for supplying the heat to the compartments, as for example, a suitable hot water circulating system, water being conveyed to and from the incubator from a suitable heating device by means of the pipes 10 and 11 and circulated through suitable coils or the like (not shown) within the compartments, and if desired, suitable thermostats and dampers (not shown) may be arranged to control and regulate the temperature within the compartments. The heat supplying means and method of regulating the same, as well as means for controlling the amount of moisture in the air within the compartments form no part of the present invention.

For the purpose of supporting the eggs in the compartments, suitable means may be provided which may assume various forms of construction and the form disclosed is shown merely for the purpose of illustration. One embodiment of this construction, as shown in the drawings, may comprise one or more trays 15 of any suitable construction in each compartment and preferably so arranged as to permit the free access of air to the eggs therein and to allow the trays to be turned either side up or otherwise shifted and still properly support the eggs. The form of tray shown in the drawings comprises a frame constructed in two sections 17 and 18, each section being provided with a wire netting 19 upon one of which nettings the eggs rest when in position on the tray, the other netting serving to hold the eggs in place thereon, the eggs being first placed in one section of the tray and the other section of the tray then being placed on the first-mentioned section thereby holding the eggs in position.

Each of the trays is adapted, in the form of the invention illustrated, to be received by suitable supports, each of which comprises suitable end members 23 and 24 joined by suitable spacing bars 25, the end members 23 and 24 being provided with trunnions 27 whereby the supports are pivotally secured to the transverse partitions of the incubator. For the purpose of removably holding the trays securely with respect to the supports, the former are received between paired ledges or projections 30 and 31 preferably formed integrally with the end members 23 and 24, the ledges being provided with springs 32 or other suitable means which engage the trays and hold them firmly in position in the supports. For determining the extent to which the trays may be slid into the supports lugs or stops 35 may be provided and secured to the upper and lower members of each tray to engage the ends of the ledges 30 and 31 on members 23 and 24 as best shown in Fig. 5, when the trays are slid into the supports, these stops also serving to prevent sidewise shifting of the trays when shifted as hereinafter described.

For the purpose of permitting the eggs in the various compartments to be simultaneously or selectively turned or shifted when desired, suitable means are provided which may be of various constructions and of different arrangements of the elements of the entire mechanism since the means used may be of any desired character or construction, those shown in the drawing merely for the purpose of illustrating one form of construction comprising a suitable gear 40 preferably secured adjacent one end of each tray support and which, in practice, may conveniently form one of the end members as, for example, the end member 24, which gear is arranged to mesh with an operating gear 42 mounted on a shaft 43 extending from one end of each casing to the other and journaled in suitable apertures in the end walls of the casings, one or both ends of the shaft passing through these walls and being provided with a crank 45 by means of which the shaft can be conveniently rotated when desired. In the form of incubator shown in the drawing, two trays are provided in each compartment, although in practice the number of trays in each compartment may be varied as desired, the trays being of such size and so disposed in the compartments that the gears 40 on their respective supports will mesh with the operating gear 42 in that compartment so that by effecting the rotation of the latter by means of shaft 43 the trays in each compartment may be simultaneously rotated or shifted as desired. For the purpose of permitting the selective turning of the eggs in any compartment as by the rotation of the trays in any compartment or compartments without disturbing the trays in any other compartment means are provided whereby any of the operating gears may be disconnected from their respective shafts when desired, such means preferably consisting of a set screw 46 which normally serves to secure the gear to the shaft and which may be readily loosened, thus causing the gear to idle on the shaft and hence be inoperative to rotate the gears 40 on the adjacent tray supports when the shaft is revolved to permit the trays in that compartment to remain in fixed position, it being understood that an operating gear is preferably arranged in each compartment. It is apparent that any means or arrangement of the incubator construction could readily be used in place of that described for permitting any selected egg supporting means to remain inoperative by the operation of the common shifting means for the several compartments.

Figure 6:
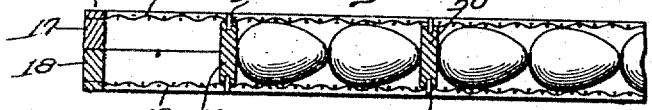

If desired, the trays may be provided with suitable adjustable partitions 50 or other suitable means for supporting the eggs in relatively fixed relation in the trays to prevent their shifting during the movement of the trays, these partitions being held in place by pins 51 extending through the nettings 19 as best shown in Fig. 6. However, in certain constructions the adjustable partitions may be dispensed with if desired, or other suitable means employed to prevent the shifting or sliding of the eggs within the trays.

It will be readily understood that in an incubator constructed as hereinbefore described, the various trays will be held in fixed position with regard to their supports and that the trays may be readily revolved from the exterior of the incubator so as to be placed at any desired angle or turned entirely over, thereby permitting the proper positioning and adjustment of the eggs during the period of incubation whenever necessary, the stops 35 being effective to prevent the trays from sliding from their supports during the turning operation. Moreover, it will be understood that by disconnecting any desired operating gear from its shaft the trays in that compartment in which the gear is positioned may be maintained in fixed position while the trays in other compartments are shifted, access being had to the interior of each compartment for the purpose of inserting or removing the trays and of adjusting the operating gears on the shafts by means of suitable doors 52 conveniently arranged in the sides of the casing.

While I have herein illustrated and described an incubator embodying one form of my invention with considerable particularity, I do not thereby intend or desire to limit myself specifically thereto as various changes and modifications may be made in the various instrumentalities employed in the invention and in the details of construction and arrangement thereof as desired, and the invention may be adapted for use with other forms of incubators and with any desired form of egg supporting means other than those shown herein, without departing from the spirit and scope of the invention as defined in the appended claims.

Having thus described my invention, I claim and desire to protect by Letters Patent of the United States:

1. In an incubator, the combination of a plurality of separate compartments with common means adapted to turn the position of the eggs in each of the compartments, said means including an arrangement for operatively connecting or disconnecting the common turning means for each compartment whereby the eggs in the several compartments may be selectively or simultaneously operated by said turning means.

2. In an incubator, the combination of a plurality of separate compartments, egg supporting means within each of said compartments and common means for simultaneously or selectively turning the eggs in the several compartments as may be desired by the operator.

3. The combination with an incubator having a plurality of compartments, a removable egg supporting tray within each compartment, a shaft extending longitudinally through said compartments, a gear associated with each of said trays and adapted, when operated, to turn the tray in its compartment and a gear positioned on said shaft in each of said compartments adapted to drive said first-mentioned gear, one of said gears arranged to be operatively connected or disconnected from its driving means whereby the shaft may operate to simultaneously or selectively turn the trays in the several compartments.

4. In an incubator, the combination with a plurality of compartments, egg-supporting means within each of said compartments, means extending outside of said incubator and operative to shift the position of said egg-supporting means of the several compartments to turn the eggs therein, gear mechanism on said egg supporting means adapted to be operated by said shifting means, the construction being such that the mechanism may be arranged to permit the gear mechanism in any desired compartment to remain unoperated by said shifting means.

In witness whereof, I have hereunto set my hand this 18th day of August, A. D. 1916.

HOWARD L. DAVIS.